(12) United States Patent
Montagna et al.

(10) Patent No.: US 6,403,195 B1
(45) Date of Patent: Jun. 11, 2002

(54) COMPOSITE PANEL STRUCTURE AND METHOD OF MAKING SAME

(75) Inventors: John Montagna, Metamora; Leslie E. Smith, Lapeer, both of MI (US); Zbigniew Roman Pedzinski, Sarnia (CA)

(73) Assignee: Durakon Industries, Inc., Lapeer, MI (US)

( * ) Notice: Subject to any disclaimer, the term of this patent is extended or adjusted under 35 U.S.C. 154(b) by 0 days.

(21) Appl. No.: 09/522,795

(22) Filed: Mar. 10, 2000

(51) Int. Cl.$^7$ .................................................. B32B 3/24
(52) U.S. Cl. ............................. 428/71; 428/73; 428/76; 428/139; 428/140; 428/117; 264/511; 264/274; 264/45.1; 264/46.4; 264/46.5; 264/273; 156/242; 156/244.12
(58) Field of Search ........................... 428/71, 73, 76, 428/139, 140, 117; 264/511, 274, 45.1, 46.4, 46.5, 273; 156/242, 244.12

(56) References Cited

U.S. PATENT DOCUMENTS

| | | | | |
|---|---|---|---|---|
| 1,943,757 A | * | 1/1934 | Delaney | 106/DIG. 3 |
| 2,055,032 A | * | 9/1936 | Johnson | 428/140 |
| 3,216,167 A | * | 11/1965 | Roberts | 181/290 |
| 3,970,324 A | * | 7/1976 | Howat | 156/197 |
| 4,044,083 A | * | 8/1977 | Howe et al. | 264/261 |
| 4,075,380 A | * | 2/1978 | Moens | 428/119 |
| 4,150,186 A | * | 4/1979 | Kazama | 156/210 |
| 4,361,613 A | * | 11/1982 | Bogner et al. | 156/212 |
| 4,585,683 A | * | 4/1986 | Curnow | 428/316.6 |
| 4,687,691 A | * | 8/1987 | Kay | 156/252 |
| 4,835,034 A | * | 5/1989 | Cruz | 428/131 |
| 4,849,277 A | * | 7/1989 | Jaklofsky | 156/213 |
| 4,857,380 A | * | 8/1989 | Kent | 264/45.3 |
| 4,980,214 A | * | 12/1990 | Charriere | 264/342 R |
| 5,104,715 A | * | 4/1992 | Cruz | 156/250 |
| 5,338,594 A | * | 8/1994 | Wang et al. | 156/197 |
| 5,348,778 A | * | 9/1994 | Knipp et al. | 312/400 |
| 5,569,508 A | * | 10/1996 | Cundiff | 244/133 |
| 5,741,574 A | * | 4/1998 | Boyce et al. | 428/112 |
| 5,935,675 A | * | 8/1999 | Hayden et al. | 428/317.1 |
| 6,224,706 B1 | * | 5/2001 | Matich | 156/212 |

\* cited by examiner

*Primary Examiner*—William P. Watkins, III
(74) *Attorney, Agent, or Firm*—Brinks Hofer Gilson & Lione

(57) ABSTRACT

A composite material includes five distinct layers of material: two thin outer layers or panels, a central rigid core and intermediate foam layers on both sides of the core which fill the regions between the core and outer panels. The core can be a wide variety of material but is preferably a rigid foam or wood having resin or epoxy impregnated fiber or fiber filled outer skins. An array of apertures extends through the core. During the fabrication process, the apertures facilitate cross flow of the foam and ensure even distribution thereof. As a finished product, the foam filled apertures ensure positive location and retention of the core within the foam. The foam may be any suitable injectable foam but is preferably a composition which remains resilient upon curing as such foam more readily accommodates dimensional changes between the layers due to, for example, ambient temperatures changes. The core and foam are surrounded with top and bottom panels of a moldable thermoplastic material such as high density polyethylene (HDPE) which is capable of being molded with a high quality exterior finish.

19 Claims, 10 Drawing Sheets

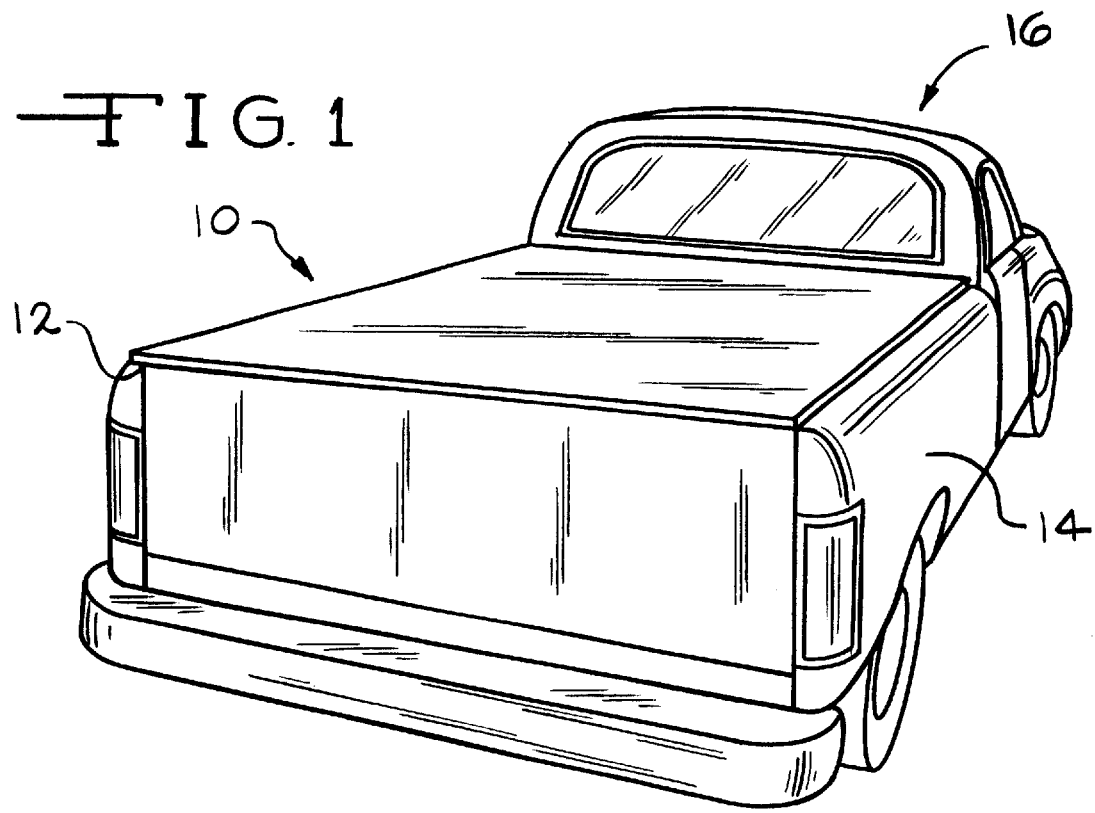
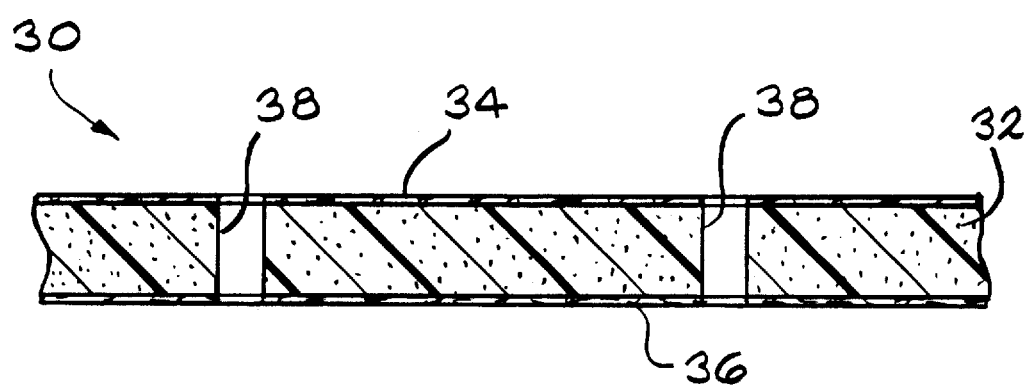

COMPOSITE PANEL STRUCTURE AND METHOD OF MAKING SAME

BACKGROUND OF THE INVENTION

The invention relates generally to panels or sheets of composite material as well as a method of making same and more specifically to a composite material having an inner core disposed between smooth outer panels and intermediate regions of foam as well as a method of making this composite structure.

Many types of plastic composites have been proposed. Both a wide selection of thermoplastic and thermosetting materials have been combined in multiple layers with various intermediate and reinforcing materials to provide many different composite materials exhibiting specific structural characteristics intended for equally specific applications. For example, a composite having a center section of end grain balsa wood disposed between outer resin impregnated fabric layers has been found to provide exceptional strength and rigidity while exhibiting good sound deadening qualities.

A drawback of many such composites, particularly those constituted of only plastic and especially thermoplastic materials, is cold flow or creep. Cold flow or creep is generally defined as that tendency of a structural material which is typically under load to slowly deflect or deform. Although such deformation, to a greater or lesser extent, occurs slowly over extended periods of time, it is generally perceived as permanent inasmuch as only exposure to a reverse load for approximately the same period of time will reverse such deformation. At elevated temperatures, of course, such as experienced by panels or structures exposed to direct, i.e., outdoor, sunlight, creep or cold flow is significantly accelerated.

Such creep or cold flow is a significant disadvantage of many components fabricated of thermoplastic or thermoset materials and frequently limits the use of such materials to applications which are not exposed to outdoor sunlight, relatively high temperatures or significant static loading. This invention is directed to minimizing this drawback of these materials.

SUMMARY OF THE INVENTION

The composite structure includes five distinct layers of material: two outer layers or panels, a central rigid core and intermediate foam layers on both sides of the core between the core and the outer panels. The core can be a wide variety of materials but is preferably a rigid foam, aluminum honeycomb or wood having resin or epoxy impregnated fiber or fiber filled outer skins. An array of apertures extends through the core. During the fabrication process, the apertures facilitate cross flow of the liquid foam and ensure even distribution thereof. As a finished product, the foam layers on both sides of the core which extend through the apertures ensure positive location and retention of the core within the foam and ensure conformance to outer surface geometry. The foam may be any suitable injectable foam but is preferably a composition which remains resilient upon curing as such foam more readily accommodates dimensional changes between the layers due to, for example, ambient temperatures changes. The core and foam are surrounded with top and bottom panels of a moldable thermoplastic material such as high density polyethylene (HDPE) or thermoplastic polyolefin (TPO) which is capable of being molded with a high quality exterior finish which may be painted.

A method of fabricating the composite panel material also forms a portion of the present invention. The method includes the steps of providing an upper and lower mold in the shape of the final product and placing a first heated, planar sheet of material such as TPO or HDPE adjacent the lower mold and vacuum forming it. A previously fabricated core is disposed within the interior of the first molded panel and positioned away from it by suitable spacers. The center core, as noted above, includes an array of apertures or passageways and may further include reinforcing members which are positioned to align with mounting members such as threaded fasteners which are used to secure the finished composite structure to hinge members or other mounting components. Then, a second, heated planar sheet of material is positioned adjacent the upper mold and it is vacuum formed. The molds are then aligned and the molds and formed panels are brought together. The mold is then rotated 90 degrees such that the panels and center core are vertically oriented. Expanding foam constitutent(s) are injected into the mold and it is filled to the level of up to approximately ten to twenty percent. The foam then expands and completely fills the interior on both sides of the core and passes through the core passageways as well. Upon curing of the foam, the composite structure is removed from the mold and excess material is trimmed from its periphery.

Products incorporating these features and/or manufactured by this method are highly suitable as cargo and tonneau covers for light trucks and pickup trucks, for vehicle flooring, for truck beds and tailgates and other applications requiring panels having good strength, rigidity and resistance to creep.

It is thus an object of the present invention to provide a composite panel structure having smooth outer surfaces.

It is a further object of the present invention to provide a composite panel structure having a rigid inner core and smooth outer panels.

It is a still further object of the present invention to provide a composite panel structure having outer panels with smooth, grained or painted outer surfaces, a rigid core and intermediate layers of foam between the core and both outer panels.

It is a still further object of the present invention to provide a composite panel structure wherein the core has reinforcing members which accept fasteners for attaching the structure to hinges and other external mounting components.

It is a still further object of the present invention to provide a method for fabricating a composite panel structure.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIG. 1 is a perspective view of a exemplary composite panel structure according to the present invention which is utilized as a tonneau cover for a pick up truck;

FIG. 4 is a fragmentary, sectional view of a core of a composite panel structure according to the present invention taken along line 4—4 of FIG. 3;

DESCRIPTION OF THE PREFERRED EMBODIMENT

Figure 2:
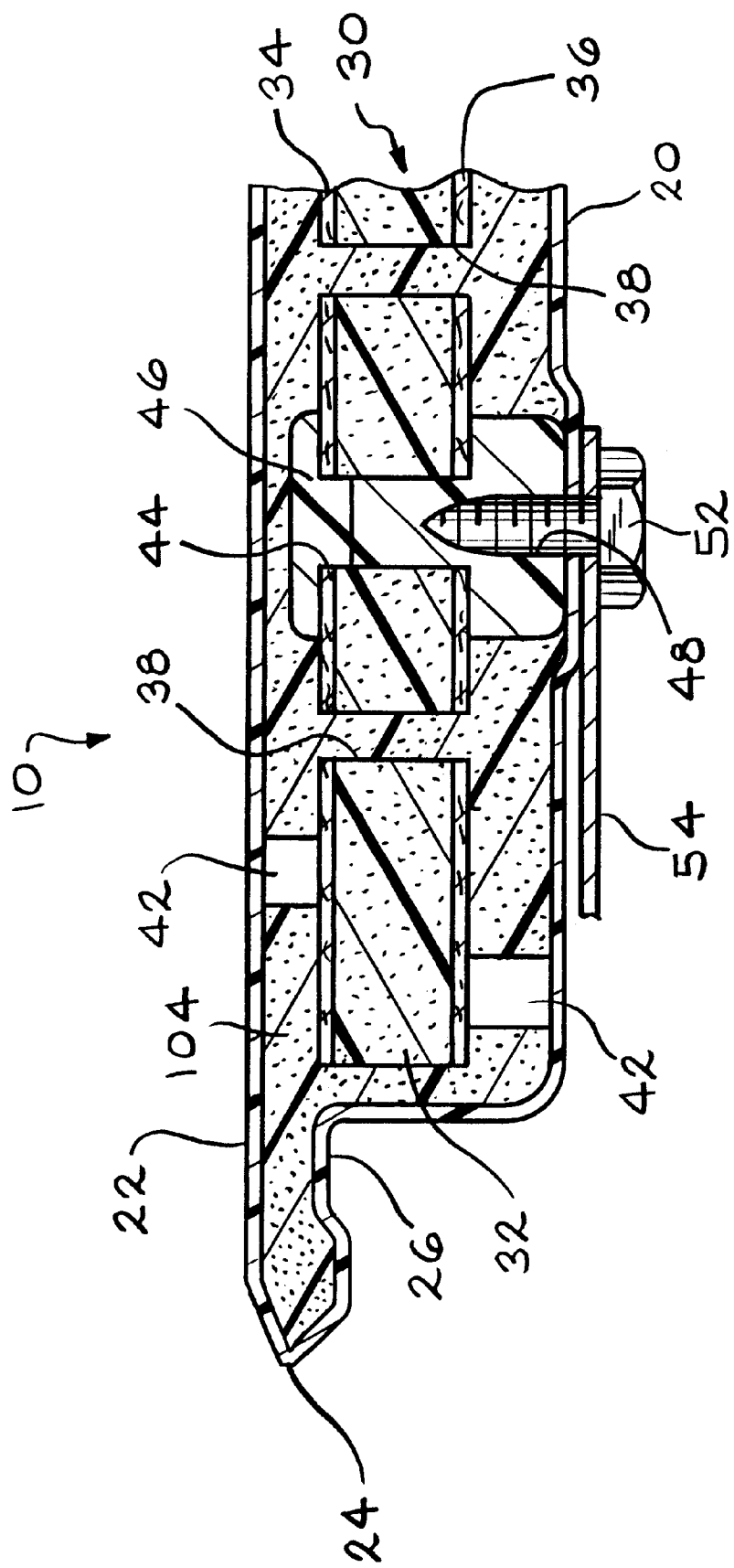
FIG. 2 is a fragmentary, sectional inverted view of a portion of a composite panel structure according to the present invention providing details of reinforcing and fastener structure for a composite panel structure according to the present invention.
Figure 3:
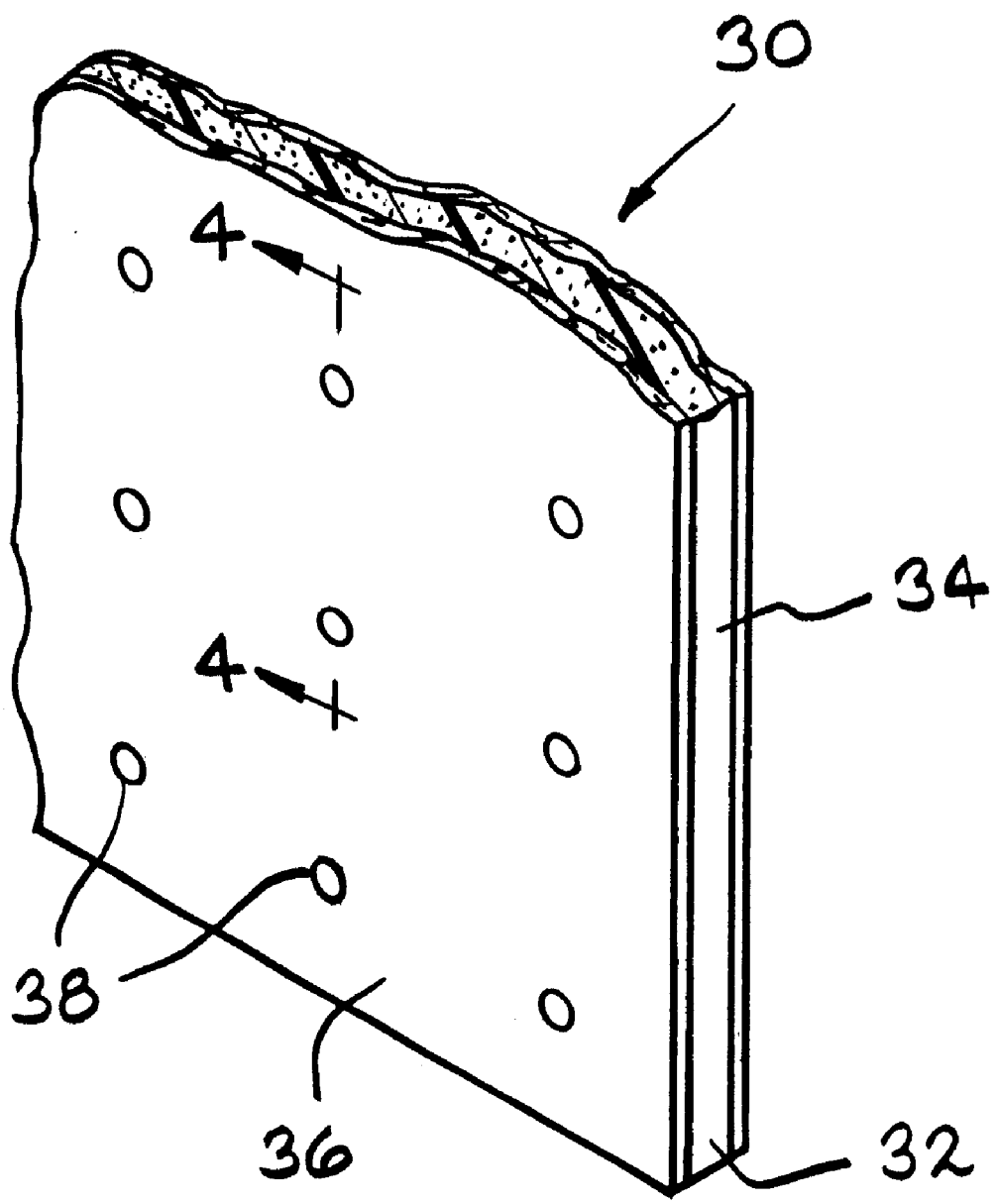
FIG. 3 is a fragmentary, perspective view of a core for a composite panel structure according to the present invention.

Referring now to FIG. 1, a composite panel structure according to the present invention is illustrated and generally designated by the reference numeral 10. The composite panel structure 10 in FIG. 1 is configured as a rigid tonneau cover disposed over and protecting the load carrying area 12 of a bed 14 of a conventional pickup truck 16. As illustrated in FIG. 2, the composite panel structure 10 includes a first or upper exterior skin or panel 20 and a second or lower exterior skin or panel 22, which merge together and are sealed about their periphery at a peripheral bead 24. The first and second panels 20 and 22 are preferably formed of a thermoplastic or thermosetting material such as high density polyethylene (HDPE)or thermoplastic polyolefin (TPO). Adjacent the outer peripheral bead 24 is a peripheral channel 26 which may receive a weather strip or similar gasket (not illustrated) which engages and seals against the top rail of the pickup truck bed 14. Offset slightly from the horizontal centerline or disposed on the centerline of the composite panel structure 10 is a rigid core assembly 30 also illustrated in FIG. 4. The rigid core assembly 30 includes a center core 32 preferably fabricated of stable, rigid material such as aluminum honeycomb, polyurethane foam, polypropylene foam, polystyrene foam, blends of polystyrene and polyphenylene oxide, and other materials. The planar faces 34 and 36 of the core assembly 30 preferably are aluminum or include epoxy or resin impregnated outer layers of fabric which may be either unidirectional, bi-directional or random weave fabric of fiberglass, carbon fiber or other materials. As illustrated in FIGS. 3 and 4, the rigid core assembly 30 includes an array of through apertures 38 arranged on, for example, three inch (76.2 mm) to four (101.6 mm) inch centers.

A plurality of spacers 42 extend between the planar faces 34 and 36 and the adjacent interior faces of the panels 20 and 22 to fixedly position the rigid core assembly 30 during fabrication. The rigid core assembly 30 also includes larger apertures 44 which receive rugged plastic or metal reinforcing assemblies 46 which are secured to the rigid core assembly 30. The reinforcing members 46 are preferably two piece devices made of, for example, nylon which include male and female interengaging components which secure the two pieces of the reinforcing member 46 together on opposite faces of the rigid core assembly 30 through one of the apertures 44. The reinforcing members 46 each include a smooth or threaded aperture 48 which receives a complementary self-threading or threaded fastener 52. The fastener 52 is utilized to attach, for example, an arm 54 of a hinge or other support structure to the composite panel structure 10 as will be readily appreciated. The reinforcing structures 46 distribute forces applied to the rigid panel structure 10 by the fastener 52 and the arm 54 and provide a secure attachment feature therefor.

Figure 5:
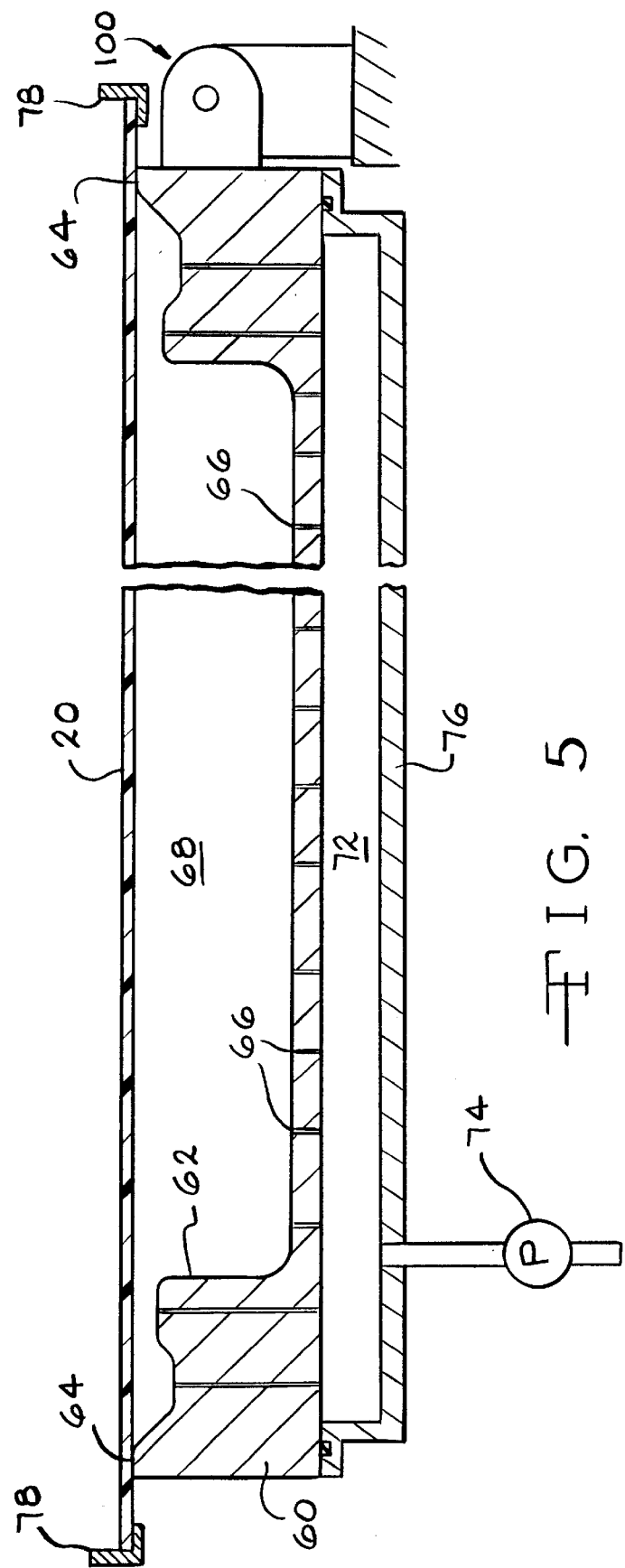
FIG. 5 is a full, sectional view of a lower vacuum forming mold utilized in the fabrication of a composite panel structure according to the present invention.

Turning now to FIG. 5, a method of manufacturing the composite planar structure 10 is illustrated. A lower mold section 60 having a conventional vacuum molding surface 62 defining a negative of the final desired lower surface of the component or structure 10 is provided. The lower mold section 60 includes a peripheral raised edge or rim 64. The mold 60 also includes a plurality of relatively small apertures 66 extending from a lower mold cavity 68 to a vacuum plenum 72 which communicates with a first vacuum pump 74. The plenum 72 is defined by a chamber or outer wall 76 which is sealed and secured to the back side of the lower mold section 60 as illustrated.

The first or upper skin or panel 20 is provided to the lower mold section mold 60 in a state of elevated temperature. Such elevated temperature may be achieved by heating the first panel 20 by subjecting it to, for example, infra-red radiation or heated, circulating air or the first panel 20 may be utilized promptly after it has been extruded from a forming station and before it has had an opportunity to cool. The first panel 20 is carried to and placed over the mold cavity 68 by a peripheral carrier frame 78. The vacuum pump 74 is then activated.

Figure 6:
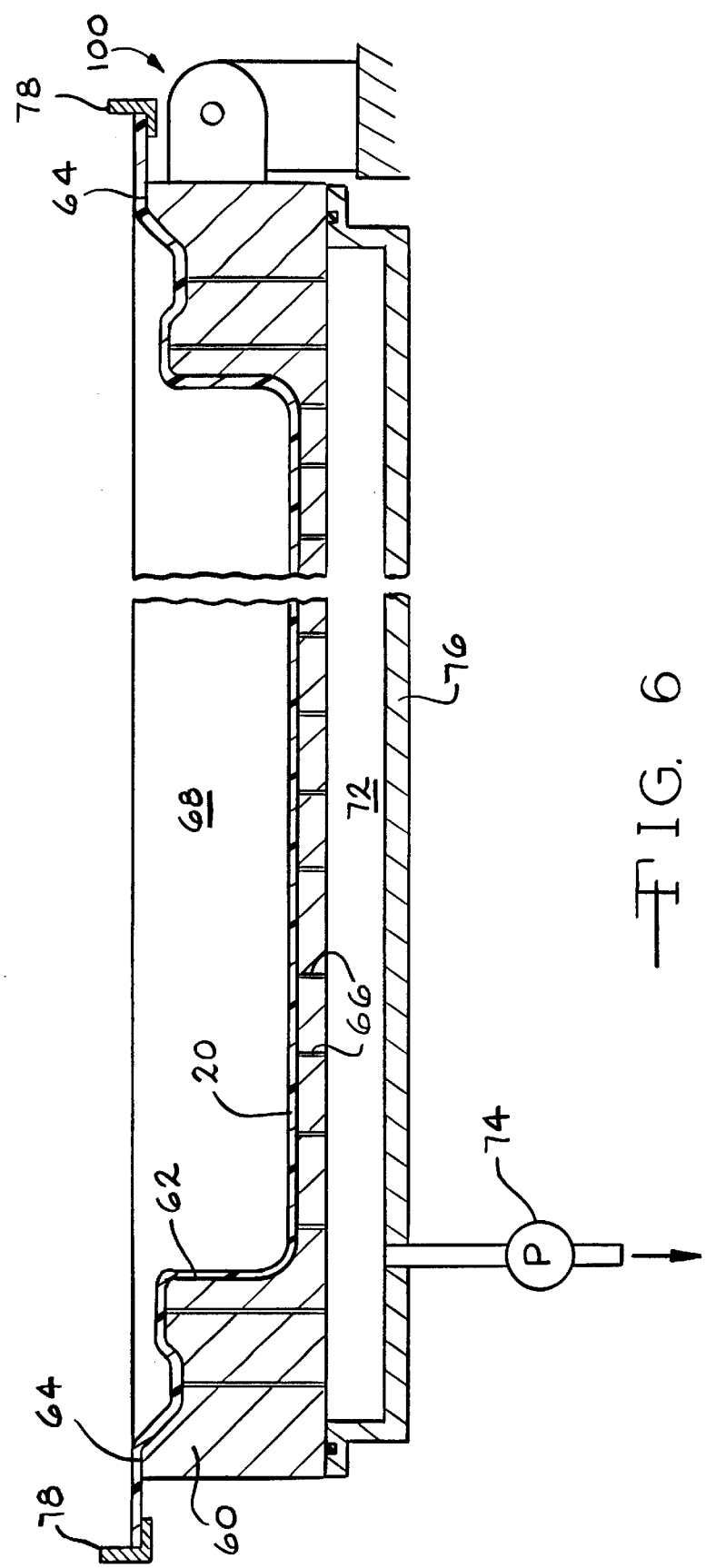
FIG. 6 is a full, sectional view of the lower vacuum forming mold with an upper formed panel for a composite panel structure according to the present invention.

As illustrated in FIG. 6, upon application of a vacuum for a suitable period of time, the first or upper panel 20 is drawn into the mold cavity 68 and conforms to the interior surface 62 of the mold cavity 68.

Figure 7:
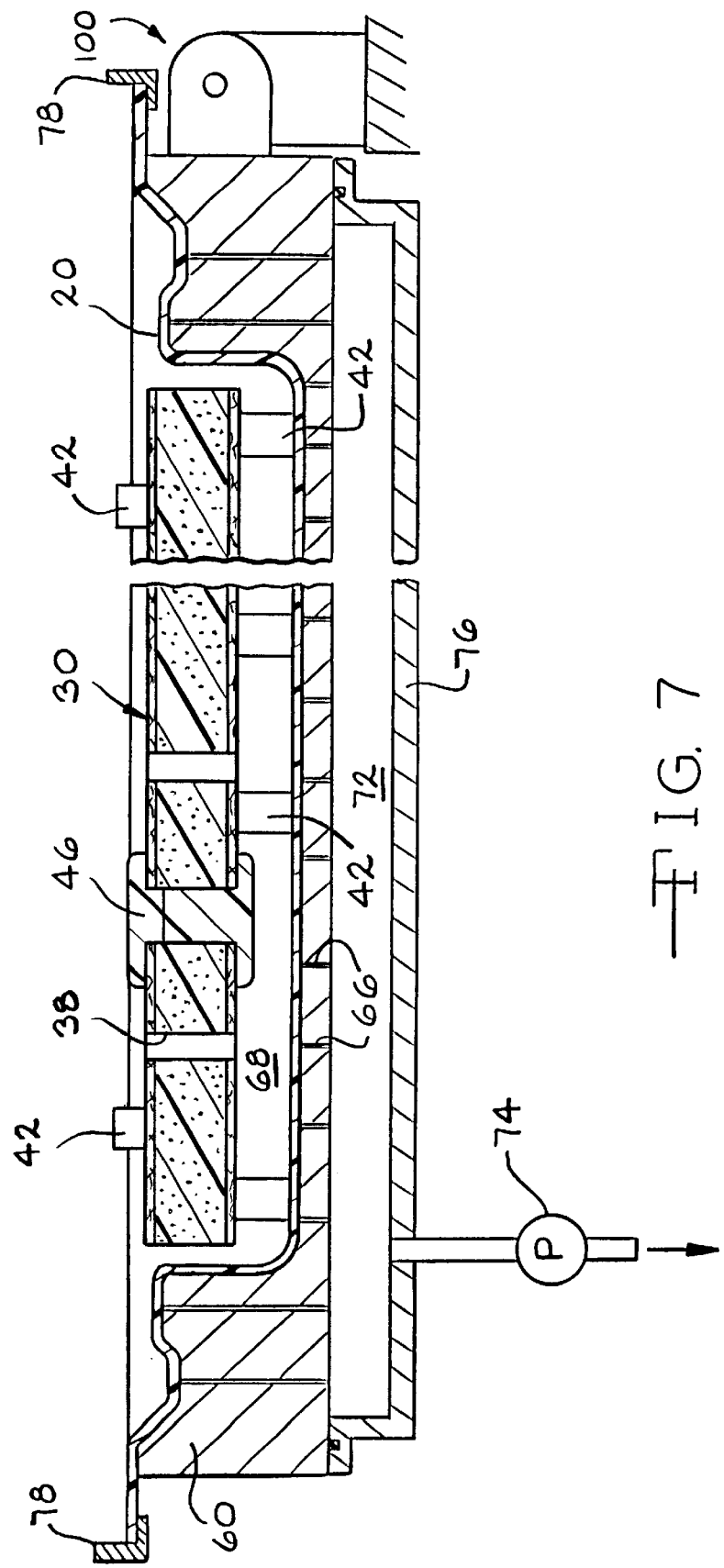
FIG. 7 is a full, sectional view of the lower vacuum forming mold with an upper formed panel and a core disposed on supports for a composite panel structure according to the present invention.

Referring now to FIG. 7, a plurality of spacers 42 are disposed on the upper (inner) surface of the first panel 20 within the mold cavity 66 in suitable numbers and locations to support the rigid core assembly 30 and position it away from the upper (inner) surface of the first panel 20. The rigid core assembly 30 is then placed upon the spacers 42 on the inner surface of the first panel 20. The rigid core assembly 30, as described above, includes a plurality of passageways 38 and typically includes reinforcing structures 46 disposed in through apertures 44 at appropriate locations on the rigid core assembly 30 that will ultimately receive fasteners such as the threaded fastener 52 as discussed above and illustrated in FIG. 2. Additional spacers 42 are disposed on the upper surface of the rigid core assembly 30, again at a suitable number of locations to maintain separation between the core 30 and the inner surface of the second or lower panel 22.

Figure 8:
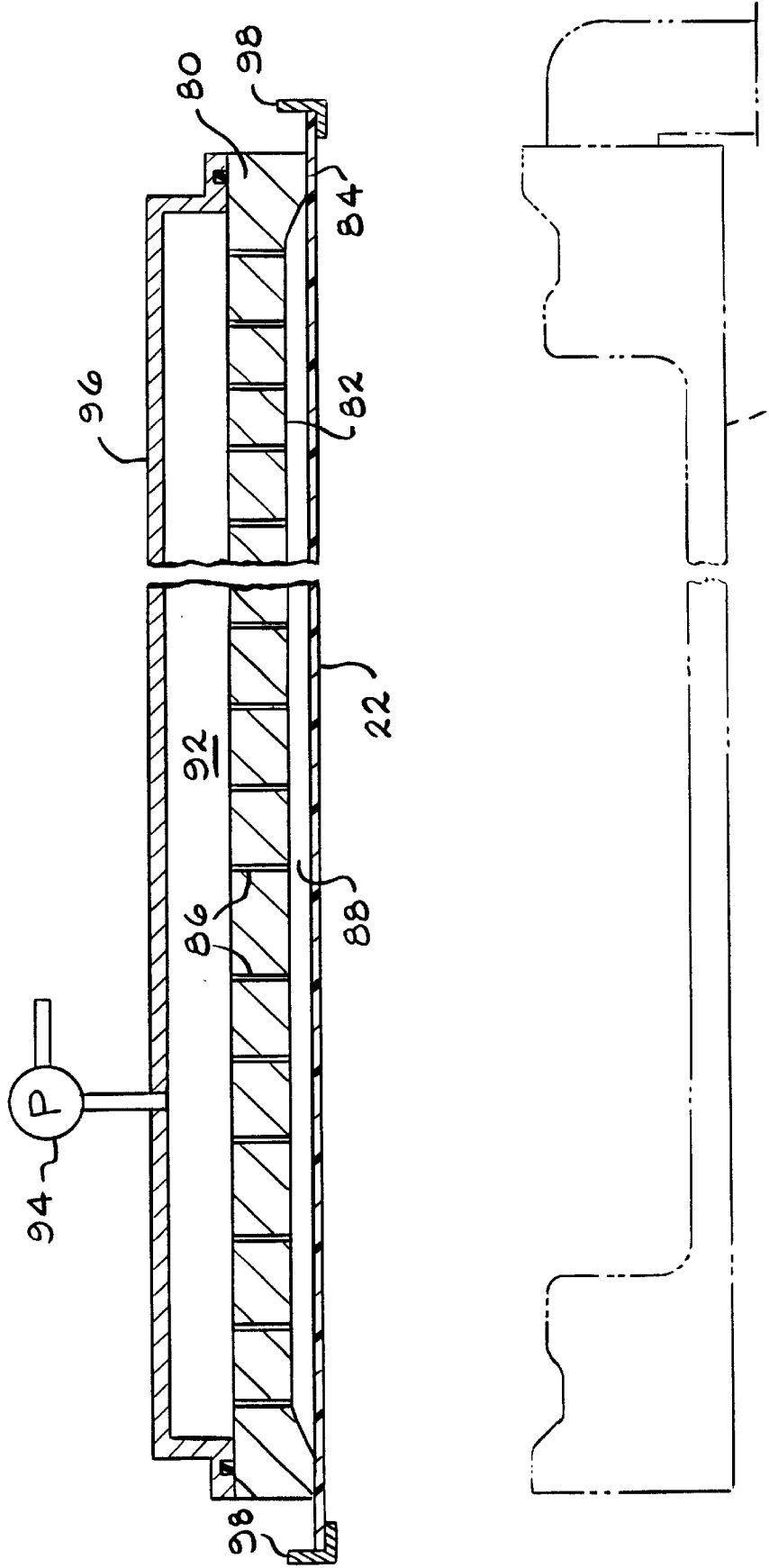
FIG. 8 is a full, sectional view of an upper vacuum forming mold utilized in the fabrication of a composite panel structure according to the present invention.

Referring now to FIG. 8, an upper mold section 80 having a conventional vacuum molding surface 82 defining a negative of the final desired upper surface of the component or structure 10 is provided. The upper mold section 80 includes a projecting peripheral edge or rim 84. The mold section 80 also includes a plurality of relatively small apertures 86 extending from an upper mold cavity 88 to a vacuum plenum 92 which communicates with a second vacuum pump 94. The plenum 92 is defined by a outer chamber or outer wall 96 which is sealed and secured to the back side of the upper mold section 80 as illustrated.

The second or lower skin or panel 22 is provided to the upper mold section 80 at an elevated temperature. As noted above, such elevated temperature may be achieved by heating the second panel 22 by subjecting it to infra-red radiation or heated, circulating air. Alternatively, the second panel 22 may be utilized promptly after it has been extruded from a forming station and before it has had an opportunity to cool. The second panel 22 is carried to and positioned adjacent the edge or rim 84 of the upper mold section 80 by a peripheral carrier frame 98. The second vacuum pump 94 is then activated.

Figure 9:
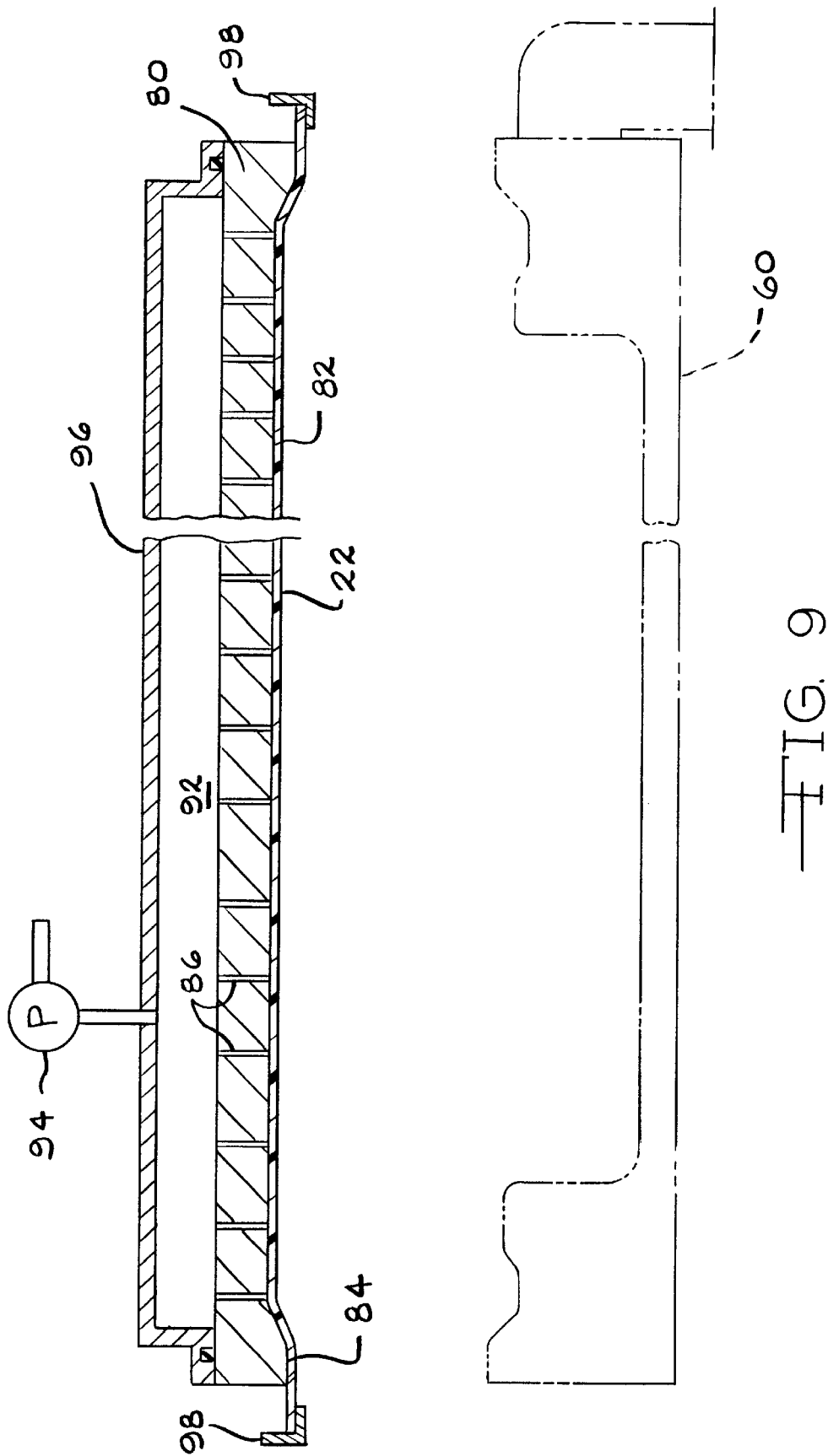
FIG. 9 is a full, sectional view of the upper vacuum forming mold with a lower formed panel for a composite panel structure according to the present invention.

As illustrated in FIG. 9, upon application of a vacuum for a suitable period time, the second or lower panel 22 is drawn into the mold cavity 88 and conforms to the interior surface 82 of the mold cavity 88.

Figure 10:
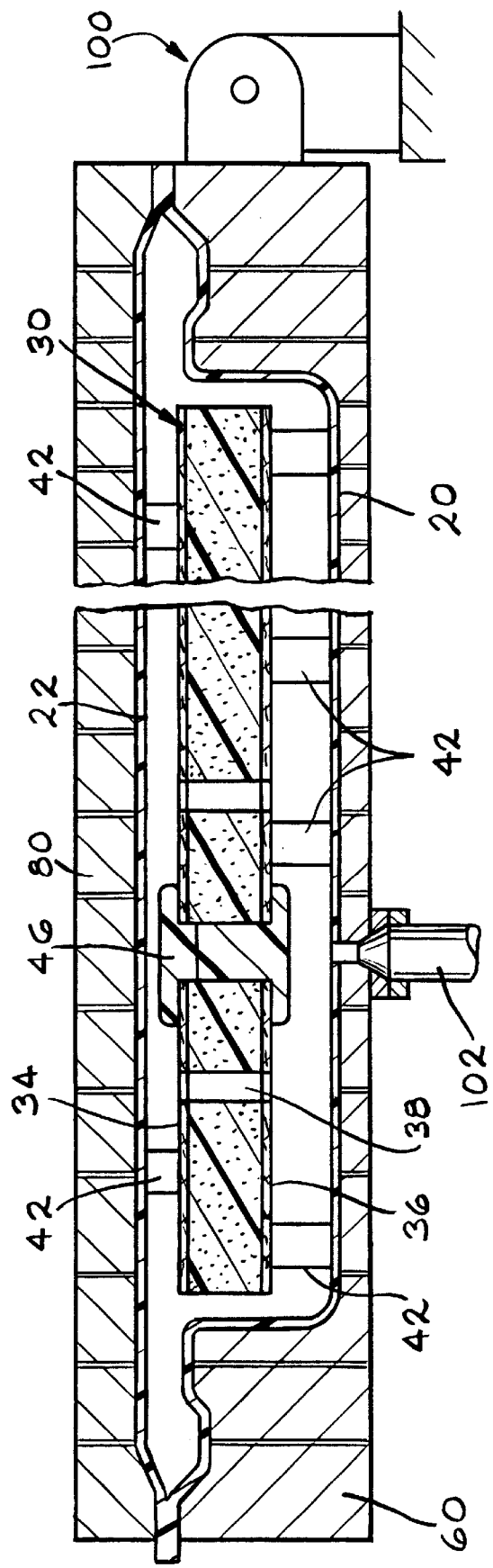
FIG. 10 is a full, sectional view of a vacuum forming mold having upper and lower panels and core during the fabrication of a composite panel structure according to the present invention.

Referring now to FIG. 10, the vacuum chambers 76 and 96 may be removed from their respective molds 60 and 80, if desired. Next, the upper mold 80 containing the second, skin or panel 22 is positioned over the lower mold section 60 and the upper mold 80 is translated into the position illustrated in FIG. 10 such that the edges or rims 64 and 84 contact and compress the edges of the first panel 20 and the second panel 22 and the peripheral seal 24 is formed about the panel structure 10. If desired, compressed air may be introduced through a nozzle 102 to ensure that the panels 20 and 22 fully and accurately conform to the mold surfaces 62 and 82. A region of flash will likely also be formed which may be readily removed by sawing, sanding, grinding or filing after the composite panel structure 10 is removed from the mold 60.

Figure 11:
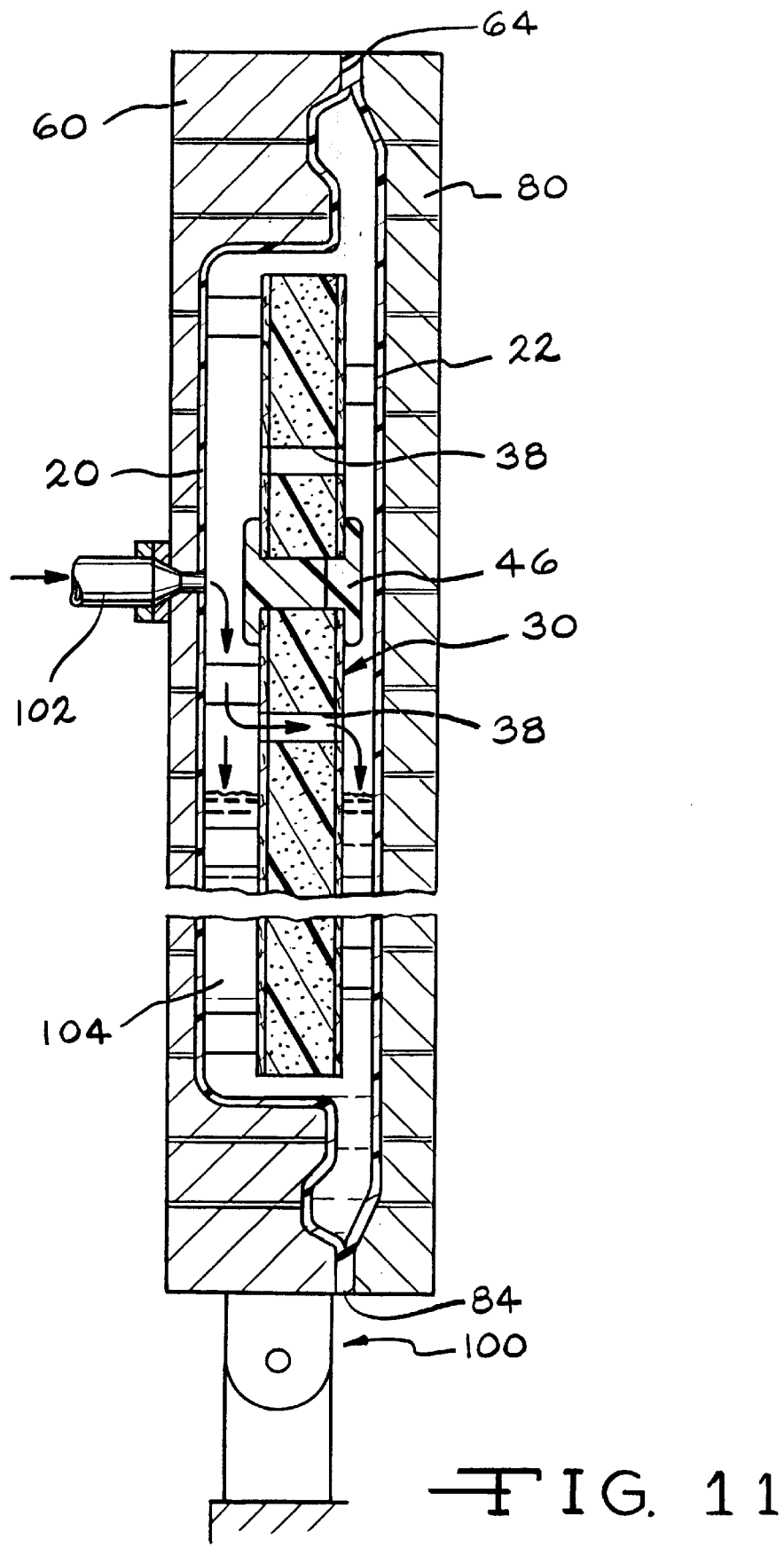
FIG. 11 is a full, sectional view of a mold for forming a composite panel structure according to the present invention during the step of injecting liquid foam constituent(s) into the mold cavity.

As illustrated in FIGS. 5, 6, 7, 8 and 9, the lower mold 60 is mounted upon a plurality of pivot assemblies 100, one of which is illustrated in the noted figures. The pivot assemblies 100 function as hinges to allow the lower mold 60 and the upper mold 80 to move from a horizontal position illustrated in FIGS. 5, 6, 7, 8, 9 and 10 to a vertical position illustrated in FIG. 11. When so disposed, the nozzle 102 on the lower mold 60 may be utilized to inject the constituent(s) of liquid foam 104 into the composite structure preferably on the side of the rigid core assembly 30 having greater width. The liquid foam constituent(s) 104, such as a two component polyurethane foam or other suitable injectable foam, is injected into the mold cavities 68 and 88 between the first panel 20 and the second panel 22 to fill the composite structure 10 approximately ten to twenty percent full, the remaining region of the composite structure 10 being filled as a result of the expansion of the liquid foam constituent(s) 104. The plurality of through passageways 38 in the rigid core assembly 30 facilitate uniform and complete distribution of the liquid foam constituent(s) 104 within the interior space of the composite structure 10. Upon curing of the liquid foam constituent(s) 104, the upper and lower mold sections 80 and 60 may be returned to a horizontal position and the upper mold section 80 moved away from the lower section 60 such that the complete composite structure 10 may be removed from the mold cavities 68 and 88.

It will be appreciated that the removal step should not be accomplished until curing of the liquid foam constituent(s) 104 is complete or substantially complete such that no expansion of the foam 104 occurs after it is removed from the confines of the mold cavities 68 and 88. Such continued expansion, of course, will result in a composite panel structure 10 have a bowed or convex shape which is generally undesirable.

It will also be appreciated the structure such as the composite panel structure 10 configured as a tonneau cover, exhibits excellent rigidity, surface finish and resistance to creep. The finish on the outer surfaces of the panels 20 and 22 can be exceedingly smooth and will readily accept a painted finish which rivals that of metal body panels. Alternatively, it may be patterned or grained by suitable treatment to the interior surface 82 of the mold 80.

The foregoing disclosure is the best mode devised by the inventors for practicing this invention. It is apparent, however, that apparatus and methods incorporating modifications and variations will be obvious to one skilled in the art of composite panel structures and methods of making them. In as much as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A composite structure comprising, in combination,
   a pair of panels formed in the configuration of a desired structure, said panels defining outer surfaces, inner surfaces and peripheries, said panels sealed about said peripheries and defining an interior space,
   a rigid core disposed in said interior space and including a plurality of spacers positioning said core away from said inner surfaces of said panels, said core including a plurality of through passageways and,
   foam disposed between said core and said inner surfaces of said outer panels and extending through said apertures.

2. The composite structure of claim 1 wherein said panel material is selected from the group consisting of high density polyethylene and thermoplastic polyolefin.

3. The composite structure of claim 1 wherein said desired structure is a tonneau cover.

4. The composite structure of claim 1 further including anchor structures extending from at least one of said inner surfaces of said panels through said core.

5. the composite structure of claim 1 wherein said core includes a rigid center and external layers of resin impregnated fibers.

6. The composite structure of claim 5 wherein said fibers comprise a woven fabric.

7. The composite structure of claim 6 wherein said foam is semi-rigid.

8. A composite panel structure comprising, in combination,
   a pair of spaced apart, vacuum formed panels having inner surfaces, said panels sealed together about their common periphery, said panels defining an interior volume,
   a rigid core having a pair of spaced apart surfaces and a plurality of apertures extending through said core,
   a plurality of spacers disposed between said rigid core and said inner surfaces of said panels for locating said core away from said interior surfaces of said panel, and
   a plastic foam disposed in said interior volume, surrounding said core and extending through said apertures.

9. The composite structure of claim 8 wherein said panel material is selected from the group consisting of high density polyethylene and thermoplastic polyolefin.

10. The composite structure of claim 8 further including anchor structures through said core.

11. The composite structure of claim 8 wherein said core includes a rigid center and external layers of resin impregnated fibers.

12. The composite structure of claim 8 wherein said fibers comprise a woven fabric.

13. The composite structure of claim 8 wherein said foam is semi-rigid.

14. The composite structure of claim 8 wherein said core is selected from the group consisting of honeycomb aluminum, polyurethane foam, polypropylene foam, polystyrene foam and a blend of polystyrene and polyphylene oxide foam.

15. A method of forming a composite panel structure comprising the steps of, providing upper and lower vacuum molds;

providing a first heated panel of a moldable plastic material to such lower mold and vacuum forming said first panel;

provide a preformed core having a plurality of through openings;

disposing said core on a plurality of spacers within said formed first panel;

providing a second heated panel to said upper mold and vacuum forming said second panel;

disposing said upper mold adjacent said lower mold section and sealing peripheries of said panels to define an interior;

moving said molds, said panels and said core to a vertical position; and injecting an expandable foam into said interior.

16. A method of claim 15 further including the step of providing a plurality of reinforcing structures in apertures extending through said core.

17. The method of claim 15 wherein said expandable foam is two component polyurethane foam.

18. The method of claim 15 wherein said preformed core includes a core having fiberglass bonded to such core by epoxy resin.

19. The method of claim 15 wherein said core is securely disposed within said panels by said expandable foam.

* * * * *

UNITED STATES PATENT AND TRADEMARK OFFICE
CERTIFICATE OF CORRECTION

PATENT NO. : 6,403,195 B1
DATED : June 11, 2002
INVENTOR(S) : John Montagna et al.

It is certified that error appears in the above-identified patent and that said Letters Patent is hereby corrected as shown below:

<u>Title page,</u>
Item [75], Inventor, add the following inventor:
-- Satish J. Doshi, Grand Blanc (MI) --.

Signed and Sealed this

Twenty-ninth Day of November, 2005

JON W. DUDAS
*Director of the United States Patent and Trademark Office*